US012033354B2

(12) United States Patent
Naganuma

(10) Patent No.: US 12,033,354 B2
(45) Date of Patent: Jul. 9, 2024

(54) SENSOR CALIBRATION SYSTEM, DISPLAY CONTROL APPARATUS, PROGRAM, AND SENSOR CALIBRATION METHOD

(71) Applicant: Sony Interactive Entertainment Inc., Tokyo (JP)

(72) Inventor: Hiromasa Naganuma, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 498 days.

(21) Appl. No.: 17/283,718

(22) PCT Filed: Oct. 10, 2019

(86) PCT No.: PCT/JP2019/039932
§ 371 (c)(1),
(2) Date: Apr. 8, 2021

(87) PCT Pub. No.: WO2020/080237
PCT Pub. Date: Apr. 23, 2020

(65) Prior Publication Data
US 2021/0327090 A1    Oct. 21, 2021

(30) Foreign Application Priority Data

Oct. 17, 2018    (JP) .................................. 2018-195505

(51) Int. Cl.
*G06T 7/80*        (2017.01)
*G01M 11/02*       (2006.01)
(Continued)

(52) U.S. Cl.
CPC .......... *G06T 7/80* (2017.01); *G01M 11/0257* (2013.01); *G01M 11/0264* (2013.01);
(Continued)

(58) Field of Classification Search
CPC . G06T 7/80; G01M 11/0257; G01M 11/0264; H04N 17/002; H04N 25/47;
(Continued)

(56) References Cited

U.S. PATENT DOCUMENTS 8,736,685 B1    5/2014  Dorenbosch
9,389,693 B2    7/2016  Lee
(Continued)

FOREIGN PATENT DOCUMENTS

JP    2007071618 A    3/2007
JP    2014535098 T    12/2014
(Continued)

OTHER PUBLICATIONS

International Preliminary Report on Patentability and Written Opinion for corresponding PCT Application No. PCT/JP2019/039932, 19 pages, dated Apr. 29, 2021.
(Continued)

*Primary Examiner* — Adam R. Giesy
(74) *Attorney, Agent, or Firm* — Matthew B. Dernier, Esq.

(57) ABSTRACT

A sensor calibration system is provided that includes a sensor apparatus including an event-driven vision sensor including a sensor array configured with sensors that generate event signals upon detection of a change in incident light intensity, and a display apparatus including a display section configured to change luminance of a planar region instantaneously with a predetermined spatial resolution as per a calibration pattern of the sensors.

14 Claims, 5 Drawing Sheets

(51) Int. Cl.
*H04N 17/00* (2006.01)
*H04N 25/47* (2023.01)
*H04N 25/68* (2023.01)

(52) U.S. Cl.
CPC .......... *H04N 17/002* (2013.01); *H04N 25/47* (2023.01); *H04N 25/68* (2023.01); *G09G 2320/0626* (2013.01); *G09G 2320/08* (2013.01); *G09G 2360/14* (2013.01); *G09G 2360/141* (2013.01); *G09G 2360/142* (2013.01); *G09G 2360/144* (2013.01); *G09G 2360/16* (2013.01)

(58) Field of Classification Search
CPC ........ H04N 25/68; H04N 25/42; H04N 25/70; G09G 2320/0626; G09G 2320/08; G09G 2360/14; G09G 2360/141; G09G 2360/142; G09G 2360/144; G09G 2360/16
See application file for complete search history.

(56) References Cited

U.S. PATENT DOCUMENTS

| | | | |
|---|---|---|---|
| 9,489,735 | B1 | 11/2016 | Reitmayr |
| 9,838,635 | B2 | 12/2017 | Gousev |
| 10,244,150 | B2 | 3/2019 | Son |
| 2003/0058252 | A1* | 3/2003 | Matsuda .................. H04N 5/74 345/589 |
| 2010/0201275 | A1* | 8/2010 | Cok .................... G06F 3/04182 315/158 |
| 2014/0320403 | A1 | 10/2014 | Lee |
| 2016/0094800 | A1 | 3/2016 | Gousev |
| 2016/0111062 | A1* | 4/2016 | Hicks ...................... G09G 5/10 345/589 |
| 2017/0155805 | A1 | 6/2017 | Son |
| 2018/0146149 | A1 | 5/2018 | Suh |

FOREIGN PATENT DOCUMENTS

| | | |
|---|---|---|
| JP | 2015115962 A | 6/2015 |
| JP | 2018501675 A | 1/2018 |
| JP | 2018085725 A | 5/2018 |
| KR | 20130040517 A | 4/2013 |
| KR | 1020170061438 A | 6/2017 |

OTHER PUBLICATIONS

International Search Report for corresponding PCT Application No. PCT/JP2019/039932, 4 pages, dated Nov. 19, 2019.
Notice of Reasons for Refusal for corresponding JP Application No. 2018195505, 14 pages, dated Sep. 6, 2022.
Office Action for corresponding Korean Patent Application No. KR 1020217011477, 9 pages, dated Jul. 9, 2022.
Notice of Allowance for corresponding KR Application No. 10-2021-7011477, 4 pages, dated Jan. 26, 2023.

* cited by examiner

211C

211F

SENSOR CALIBRATION SYSTEM, DISPLAY CONTROL APPARATUS, PROGRAM, AND SENSOR CALIBRATION METHOD

TECHNICAL FIELD

The present invention relates to a sensor calibration system, a display control apparatus, a program, and a sensor calibration method.

BACKGROUND ART

There are known event-driven vision sensors that cause pixels detecting changes in incident light intensity to generate signals in a time-asynchronous manner. The event-driven vision sensor is more advantageous than frame-type vision sensors that scan all pixels at predetermined intervals, specifically as in the case of CCD (Charge-Coupled Device) or CMOS (Complementary Metal-Oxide Semiconductor) image sensors, due to its ability to run at high speed on low power. The technologies related to the event-driven vision sensors are described in PTLs 1 and 2, for example.

CITATION LIST

Patent Literature

[PTL 1] JP 2014-535098T [PTL 2] JP 2018-85725A

SUMMARY

Technical Problem

However, although the above mentioned advantages of the event-driven vision sensors are well known, peripheral technologies that take into consideration their characteristics different from those of frame-type vision sensors, for example, have yet to be proposed sufficiently.

In view of the above, the present invention is aimed at providing a sensor calibration system, a display control apparatus, a program, and a sensor calibration method for efficiently calibrating event-driven vision sensors.

Solution to Problem

According to one aspect of the present invention, there is provided a sensor calibration system including: a sensor apparatus including an event-driven vision sensor including a sensor array configured with sensors that generate event signals upon detection of a change in incident light intensity, and a display apparatus including a display section configured to change luminance of a planar region instantaneously with a predetermined spatial resolution as per a calibration pattern of the sensors.

According to another aspect of the present invention, there is provided a display control apparatus including a display control section configured to output an image signal to a display section configured to change luminance of a planar region instantaneously with a predetermined spatial resolution as per the image signal corresponding to a calibration pattern of sensors.

According to a further aspect of the present invention, there is provided a program for causing a processing circuit connected with a display section to execute a process of outputting an image signal to the display section configured to change luminance of a planar region instantaneously with a predetermined spatial resolution as per the image signal corresponding to a calibration pattern of sensors that generate event signals upon detection of a change in incident light intensity.

According to an even further aspect of the present invention, there is provided a sensor calibration method including the steps of instantaneously changing luminance of a planar region within space corresponding to an angle of view of a sensor array as per a calibration pattern, and causing sensors constituting the sensor array to generate event signals upon detection of a change in incident light intensity.

According to the above outlined configurations, a change in luminance that occurs as a result of getting the display section to display a calibration pattern is detected in order to efficiently calibrate an event-driven vision sensor.

DESCRIPTION OF EMBODIMENTS

Some preferred embodiments of the present invention are described below in detail with reference to the accompanying drawings. Throughout the ensuing description and the drawings, the constituent elements having substantially identical functions and configurations are represented by the same reference signs, and the redundant explanations are not repeated.

Figure 1:
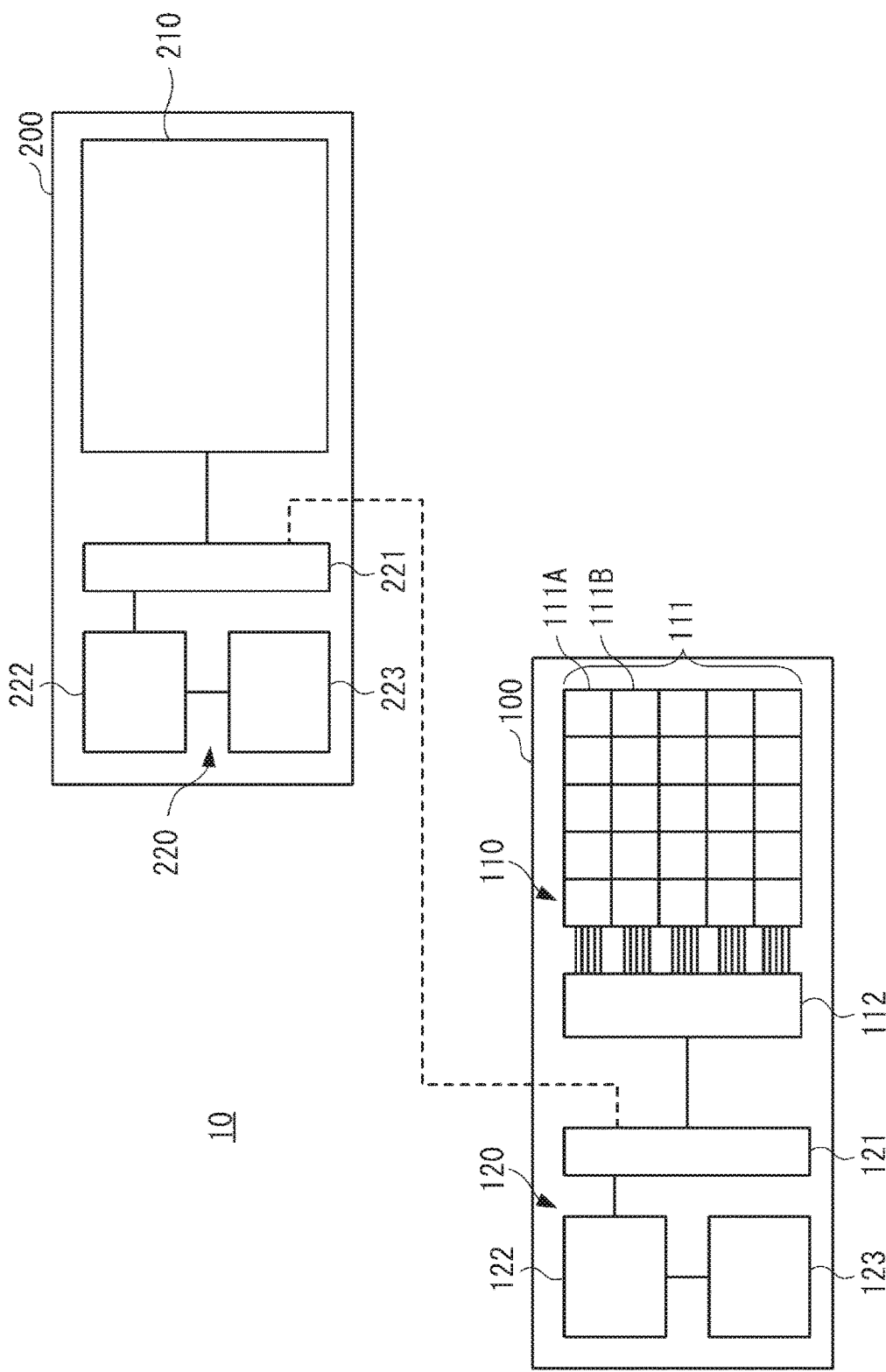
FIG. 1 is a block diagram depicting a schematic configuration of a sensor calibration system implemented as a first embodiment of the present invention.

FIG. 1 is a block diagram depicting a schematic configuration of a sensor calibration system implemented as a first embodiment of the present invention. As depicted in FIG. 1, a calibration system 10 includes a sensor apparatus 100 and a display apparatus 200. The sensor apparatus 100 includes an event-driven vision sensor 110 and a control section 120. The display apparatus 200 includes a display section 210 and a display control section 220.

In the sensor apparatus 100, the vision sensor 110 includes a sensor array 111 and a processing circuit 112 connected with each other, the sensor array 111 being configured with sensors 111A, 111B, etc., corresponding to image pixels. The sensors 111A, 111B, etc., include light receiving elements that generate event signals upon detecting changes in incident light intensity, more particularly at the time of detecting a change in luminance. The event signals are output from the processing circuit 112 as information indicating timestamps, sensor identification information (e.g., pixel positions), and luminance change polarities (increase or decrease), for example. A subject moving within an angle of view of the sensor array 111 changes the intensity of the light being reflected or scattered. This makes it possible to detect a movement of the subject in chronological order using the event signals generated by the sensors 111A, 111B, etc., corresponding to the edges of the subject, for example.

The control section 120 includes a communication interface 121, a processing circuit 122, and a memory 123. The communication interface 121 receives the event signals sent from the processing circuit 112 of the vision sensor 110 and outputs the received event signals to the processing circuit 122. Further, the communication interface 121 may communicate with the display apparatus 200 over a wired or wireless communication network. The processing circuit 122 processes the received event signals by operating in keeping with a program stored typically in the memory 123. For example, on the basis of the event signals, the processing circuit 122 generates in chronological order the images mapping the positions where luminance changes have occurred, stores the generated images in the memory 123 temporarily or permanently, and transmits the images to another apparatus via the communication interface 121. As will be discussed later, the control section 120 may analyze the event signals based on calibration patterns.

In the display apparatus 200, the display section 210 is an apparatus configured to change the luminance of a planar region instantaneously with a predetermined spatial resolution, such as an LCD (Liquid Crystal Display), an OLED (Organic Light-Emitting Diode) display, or a projector. In the ensuing description, the wording "changing luminance with a predetermined spatial resolution" means dividing a given region in space (e.g., planar region) into a predetermined number of regions and changing the luminance of each of the divided regions. Further, the wording "changing luminance instantaneously" means causing luminance changes in a short time by means of electronic switching. The LCD or the OLED display cited here as an example of the display section 210 includes electronic light emitters such as backlights or natural light emitters. In this case, the luminance of the emitted light can be changed instantaneously. In other examples, a projector may be used as the display section 210. The display section 210 is arranged in such a manner as to change the luminance of the planar region within the angle of view of the sensor array 111 at the time of performing calibration. The planar region of which the luminance is changed by the display section 210 corresponds to the display surface, for example. In the case of the projector, the planar region of which the luminance is changed is a projection plane. In this case, the main body of the projector constituting the display section 210 may be located outside the angle of view of the sensor array 111. As will be discussed later, the display section 210 is configured to change the luminance of the planar region as per calibration patterns.

The display control section 220 includes a communication interface 221, a processing circuit 222, and a memory 223. The communication interface 221 is configured to output image signals generated by the processing circuit 222 to the display section 210. The communication interface 221 may communicate with the sensor apparatus 100 over a wired or wireless communication network. The processing circuit 222 is configured to operate in keeping with a program stored typically in the memory 223 and thereby to generate the image signals corresponding to the calibration patterns displayed on the display section 210. The image signals corresponding to the calibration patterns are output to the display section 210 via the communication interface 221. For example, the processing circuit 222 reads data indicative of the calibration patterns from the memory 223 or receives such data from another apparatus via the communication interface 221.

As mentioned above, with its ability to operate at high speed on low power, the event-driven vision sensor 110 is more advantageous than the frame-type vision sensor. The reason for this is that, of the sensors 111A, 111B, etc., constituting the sensor array 111, only those that have detected luminance changes generate event signals. Because the sensors not detecting luminance changes do not generate event signals, the processing circuit 112 can process and transmit at high speed only the event signals of those sensors having detected the luminance changes. Since neither processing nor signal transmission takes place in the case where there is no luminance change, it is possible for the sensor to operate on low power. On the other hand, even if the subject is within the angle of view of the sensor array 111, there is no luminance change taking place unless the subject moves. This makes it difficult to calibrate the vision sensor 110 when, for example, stationary calibration patterns are used as the subject.

In view of the above, the calibration system 10 calibrates the vision sensor 110 by causing the display section 210 to display calibration patterns. Specifically, the data representing the calibration patterns displayed on the display section 210 is transmitted from the display apparatus 200 to the sensor apparatus 100, or an instruction to display the data indicative of a particular calibration pattern is transmitted from the sensor apparatus 100 to the display apparatus 200. This allows the processing circuit 122 of the sensor apparatus 100 to analyze the event signals based on the calibration patterns. The sensors 111A, 111B, etc., constituting the sensor array 111 generate their event signals by detecting a change in incident light intensity attributable to a luminance change in the planar region on the display section 210. This makes it possible to calibrate the vision sensor 110 by analysis of the event signals based on the calibration patterns. For example, the display section 210 may be caused to display the calibration patterns, which will be discussed below, to perform various types of calibration on the vision sensor 110. Incidentally, the analysis of event signals based on calibration patterns may be carried out by the sensor apparatus 100 as described above, by the display apparatus 200, or by another apparatus to which the data indicative of the calibration patterns and the event signals are transmitted.

Figure 2:
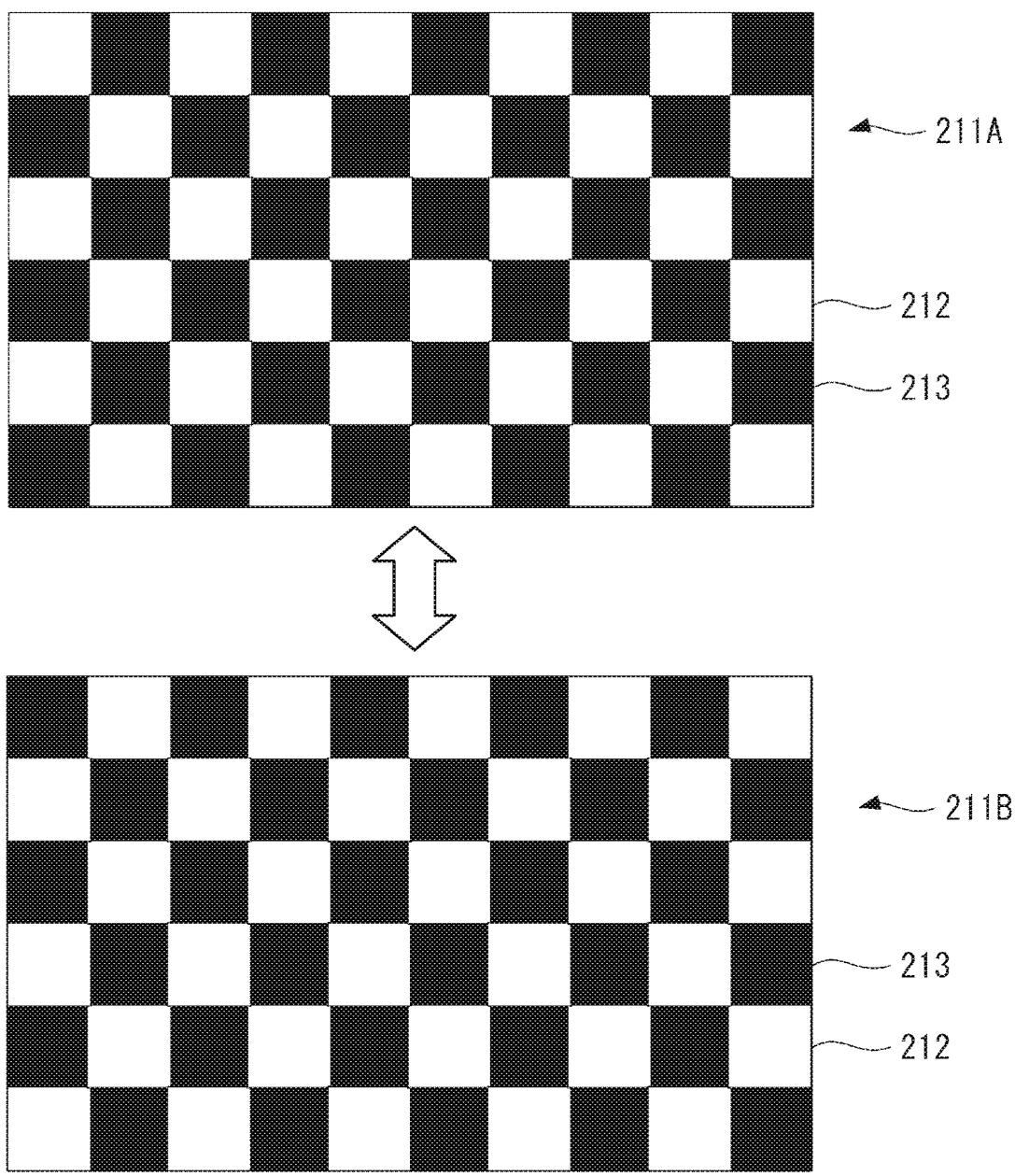
FIG. 2 is a view depicting a first example of calibration patterns.

FIG. 2 is a view depicting a first example of calibration patterns for the present embodiment. In this illustrated example, the display section 210 displays a calibration pattern 211A and a calibration pattern 211B in a switching manner. That is, the display section 210 changes the luminance of the display surface or of the planar region corresponding to the projection plane of a projector, first as per the calibration pattern 211A and then as per the calibration pattern 211B. As a result, in the planar region, a spatial distribution of luminance as per the calibration pattern 211A appears first, followed instantaneously by a spatial distribution of luminance as per the calibration pattern 211B. The calibration patterns 211A and 211B each include a high-luminance region 212 and a low-luminance region 213 arranged in a grid-like pattern. The high-luminance region 212 and the low-luminance region 213 in the calibration pattern 211B are the inverse of their counterparts in the calibration pattern 211A. Incidentally, in other examples, the high-luminance region 212 and the low-luminance region 213 are not limited to the grid-like pattern and may be arranged in any desired spatial pattern.

When the image displayed on the display section 210 of the above calibration system 10 is switched from the calibration pattern 211A to the calibration pattern 211B, those of the sensors 111A, 111B, etc., which correspond to the high-luminance region 212 in the calibration pattern 211B generate event signals indicative of an increase in luminance. Likewise, those sensors that correspond to the low-luminance region 213 generate event signals indicative of a decrease in luminance. Comparing the positional relations of the sensors generating the respective event signals with the calibration patterns 211A and 211B makes it possible to detect, for example, an image distortion caused by an optical system (not depicted in FIG. 1) of the vision sensor 110 and thereby to correct internal and external parameters as well as distortion factors defined in a manner similar to those of common cameras.

Figure 3:
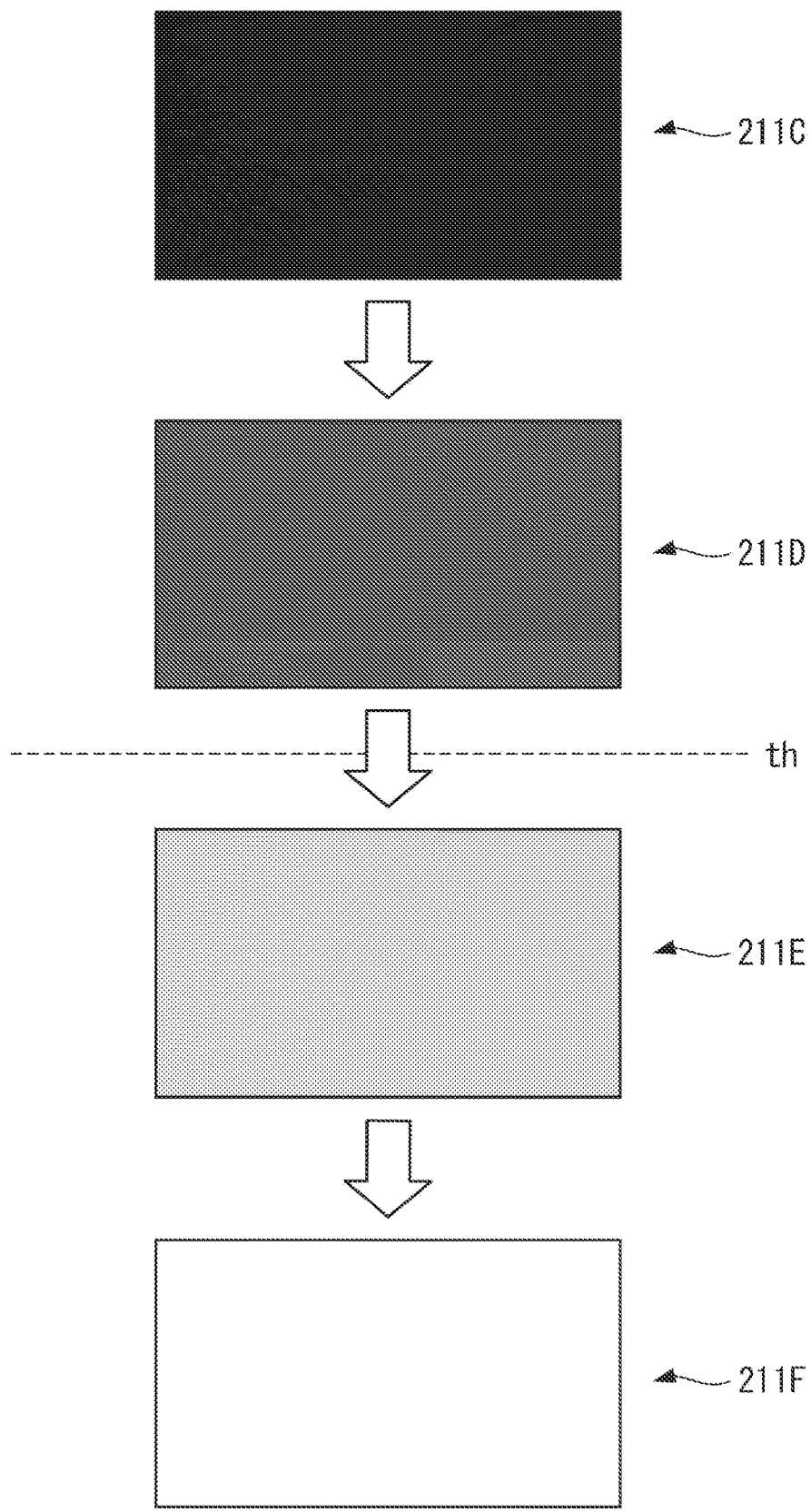
FIG. 3 is a view depicting a second example of the calibration patterns.

FIG. 3 is a view depicting a second example of the calibration patterns for the present embodiment. In this illustrated example, the display section 210 switches its display successively from a calibration pattern 211C to a calibration pattern 211D to a calibration pattern 211E to a calibration pattern 211F. That is, the display section 210 causes the luminance of the display surface or of the planar region corresponding to the projection plane of the projection to change successively as per the calibration patterns 211C through 211F. As a result, in the planar region, spatial distributions of luminance as per the calibration patterns 211C through 211F appear successively, switching from one pattern to another instantaneously. The calibration patterns 211C, 211D, 211E, and 211F are uniform in luminance and have luminance values different from each other over the entire region of the display section 210. The calibration pattern 211C has the lowest luminance value, followed by the calibration patterns 211D, 211E, and 211F with their luminance values in ascending order, the calibration pattern 211F having the highest luminance value. Incidentally, although four luminance values are switched from one to another in the illustrated example, more luminance values may be used and switched successively from one to another. Whereas the calibration patterns when displayed are switched from one to another in a monotonically increasing manner in the illustrated example, the calibration patterns may alternatively be displayed and switched from one to another in a monotonically decreasing manner.

In the above calibration system 10, when the display section 210 switches its image successively from the calibration pattern C through to the calibration pattern F, those of the sensors 111A, 111B, etc., which take the display section 210 for the subject generate event signals at some point during the switching. For example, in the case where the event signals are generated at the time of switching from the calibration pattern 211D to the calibration pattern 211E, a threshold value th at which the sensors detect a change in luminance is between the luminance value of the calibration pattern 211D and that of the calibration pattern 211E. If the threshold value thus identified fails to fall within a design range at production time of the vision sensor 110, for example, the sensors 111A, 111B, etc., may be adjusted or replaced.

Figure 4:
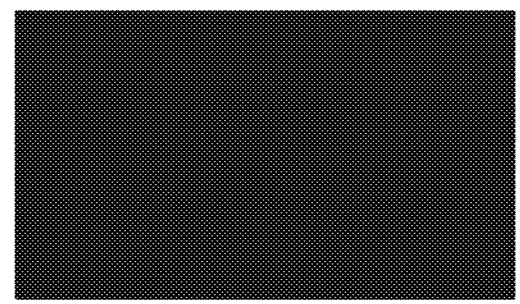
FIG. 4 is a view depicting a third example of the calibration patterns.
Figure 4:
Figure 4:
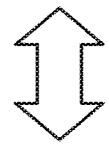
Figure 4:
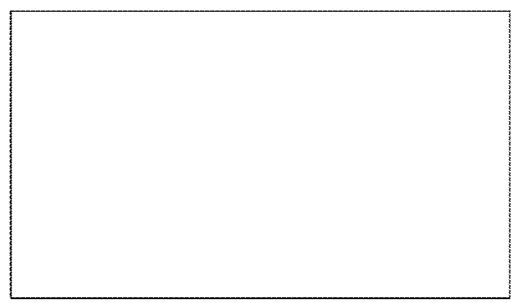
Figure 4:

FIG. 4 is a view depicting a third example of the calibration patterns for the present embodiment. In this illustrated example, as in the example explained above with reference to FIG. 2, the display section 210 displays the calibration pattern 211C and the calibration pattern 211F in a switching manner. Here, the calibration pattern 211C is constituted with a uniform low-luminance region and the calibration pattern 211F with a uniform high-luminance region.

In the above calibration system 10, when the display section 210 switches its image from the calibration pattern 211C to the calibration pattern 211F, theoretically all of the sensors 111A, 111B, etc., that take the display section 210 for the subject generate event signals indicative of an increase in luminance. Thus, any sensor that failed to generate an even signal or has generated an event signal indicative of a decrease in luminance is identified as a defective pixel (luminescent spot) Likewise, when the display section 210 switches its image from the calibration pattern 211F to the calibration pattern 211C, theoretically all of the sensors that take the display section 210 for the subject generate event signals indicative of a decrease in luminance. At this point, any sensor that failed to generate an event signal or has generated an event signal indicative of an increase in luminance is also identified as a defective pixel (luminescent spot).

Figure 5:
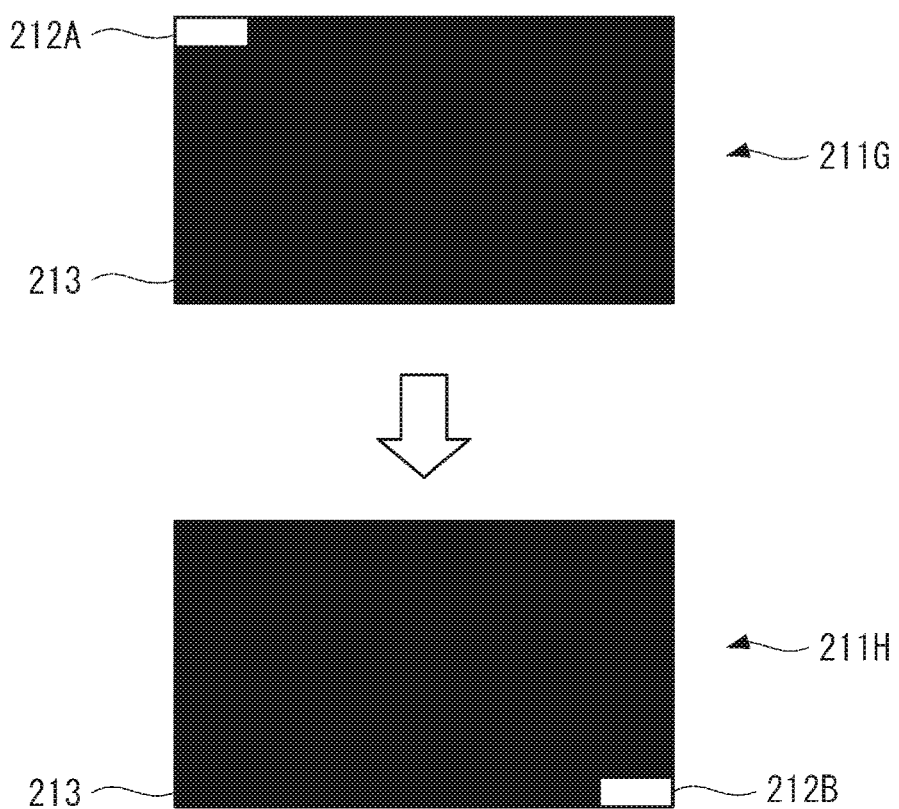
FIG. 5 is a view depicting a fourth example of the calibration patterns.

FIG. 5 is a view depicting a fourth example of the calibration patterns for the present embodiment. In this illustrated example, as in the example explained above with reference to FIG. 2, the display section 210 displays the calibration pattern 211G and the calibration pattern 211H in a switching manner. The calibration pattern 211G is fully constituted with the low-luminance region 213 except for a first portion of the planer region, specifically a top-left portion of the region where there is a high-luminance region 212A as a luminance-inverted region. On the other hand, the calibration pattern 211G is also fully constituted with the low-luminance region 213 except for a second portion of the planer region different from the first portion thereof, specifically a bottom-right portion of the region where there is a high-luminance region 212B as the luminance-inverted region. In other examples, the luminance-inverted region is not limited in position to the top-left corner or to the bottom-right corner, and the region may be located anywhere. In a further example as the inverse of the illustrated example, the calibration pattern may be fully constituted with the high-luminance region 212 except for a portion of the region made up of the low-luminance region 213 as the luminance-inverted region.

In the above calibration system 10, when the display section 210 switches its image from the calibration pattern 211G to the calibration pattern 211H, those sensors in the sensor array 111 that detect a luminance change in the first portion of the planar region generate event signals indicating that a decrease in luminance has occurred as a result of the high-luminance region 212A getting replaced with the low-luminance region 213. On the other hand, those sensors in the sensor array 111 that detect a luminance change in the second portion of the planar region generate event signals indicating that an increase in luminance has occurred as a result of the low-luminance region 213 getting replaced with the high-luminance region 212B. Except for a case where there exist effects of noise or defective pixels, the sensors that detect changes in luminance in the region other than the first portion or the second portion thereof do not generate event signals. Comparing the timestamps of the event signals generated by the respective sensors mentioned above makes it possible to compare the offset amounts of the timestamps for each of the sensors in the case where only some of the sensors have generated event signals as a result of a luminance change solely in a portion of the angle of view of the sensor array 111.

Although some preferred embodiments of the present invention have been described in detail with reference to the accompanying drawings, these embodiments are not limitative of this invention. It is obvious that those skilled in the art will easily conceive variations or alternatives of the embodiments within the scope of the technical idea stated in the appended claims. It is to be understood that such variations, alternatives, and other ramifications also fall within the technical scope of the present invention.

REFERENCE SIGNS LIST

10: Calibration system
100: Sensor apparatus

110: Vision sensor
111: Sensor array
111A, 111B: Sensor
112: Processing circuit
120: Control section
121: Communication interface
122: Processing circuit
123: Memory
200: Display apparatus
210: Display section
220: Display control section
221: Communication interface
222: Processing circuit
223: Memory
211A to 211H: Calibration pattern
212: High-luminance region
213: Low-luminance region

The invention claimed is:

1. A sensor calibration system comprising:
a sensor apparatus including an event-driven vision sensor including a sensor array configured with sensors that generate event signals upon detection of a change in incident light intensity; and
a display apparatus including a display section configured to change luminance of a planar region instantaneously with a predetermined spatial resolution as per a calibration pattern of the sensors, wherein:
the calibration pattern includes: (i) a first calibration pattern having high luminance regions and low luminance regions, and (ii) a second calibration pattern having high luminance regions and low luminance regions that are inverted as compared with the first calibration pattern,
the display section operates to display a first luminance of the planar region in accordance with the first calibration pattern, and instantaneously thereafter, changing to display a second luminance of the planar region in accordance with the second calibration pattern, by way of the display apparatus instantaneously switching display of the first calibration pattern followed by displaying the second calibration pattern.

2. The sensor calibration system according to claim 1, wherein the planar region is within an angle of view of the sensor array.

3. The sensor calibration system according to claim 1, wherein
the display apparatus further includes a display control section configured to output an image signal corresponding to the calibration pattern to the display section, and
the sensor apparatus further includes a control section configured to analyze the event signals based on the calibration pattern.

4. The sensor calibration system according to claim 1, wherein the display section includes an electronic light emitter.

5. The sensor calibration system according to claim 1, wherein
the first calibration pattern is constituted with a uniform low-luminance region, and
the second calibration pattern is constituted with a uniform high-luminance region.

6. The sensor calibration system according to claim 1, wherein
the first calibration pattern includes a luminance-inverted region in a first portion of the planar region, and
the second calibration pattern includes a luminance-inverted region in a second portion of the planar region that is different from the first portion thereof.

7. The sensor calibration system according to claim 1, wherein
the calibration pattern includes a plurality of calibration patterns having uniform luminance with luminance values that differ from each other, and
the display section successively changes the luminance of the planar region as per the plurality of calibration patterns in such a manner that the luminance values either increase or decrease monotonically.

8. A display control apparatus comprising:
a display control section configured to output an image signal to a display section configured to change luminance of a planar region instantaneously with a predetermined spatial resolution as per the image signal corresponding to a calibration pattern of sensors that generate event signals upon detection of a change in incident light intensity, wherein:
the calibration pattern includes: (i) a first calibration pattern having high luminance regions and low luminance regions, and (ii) a second calibration pattern having high luminance regions and low luminance regions that are inverted as compared with the first calibration pattern,
the display section operates to display a first luminance of the planar region in accordance with the first calibration pattern, and instantaneously thereafter, changing to display a second luminance of the planar region in accordance with the second calibration pattern, by way of the display apparatus instantaneously switching display of the first calibration pattern followed by displaying the second calibration pattern.

9. The display control apparatus according to claim 8, wherein the display section includes an electronic light emitter.

10. The display control apparatus according to claim 8, wherein
the first calibration pattern is constituted with a uniform low-luminance region, and
the second calibration pattern is constituted with a uniform high-luminance region.

11. The display control apparatus according to claim 8, wherein
the first calibration pattern includes a luminance-inverted region in a first portion of the planar region, and
the second calibration pattern includes a luminance-inverted region in a second portion of the planar region that is different from the first portion thereof.

12. The display control apparatus according to claim 8, wherein
the calibration pattern includes a plurality of calibration patterns having uniform luminance with luminance values that differ from each other, and
the image signal is output to the display section thereby causing the display section to successively change the luminance of the planar region as per the plurality of calibration patterns in such a manner that the luminance values either increase or decrease monotonically.

13. A non-transitory, computer readable storage medium containing a program, which when executed by a computer, causes a processing circuit connected with a display section to execute:
outputting an image signal to the display section configured to change luminance of a planar region instantaneously with a predetermined spatial resolution as per the image signal corresponding to a calibration pattern of sensors that generate event signals upon detection of a change in incident light intensity, wherein:

the calibration pattern includes: (i) a first calibration pattern having high luminance regions and low luminance regions, and (ii) a second calibration pattern having high luminance regions and low luminance regions that are inverted as compared with the first calibration pattern, the display section operates to display a first luminance of the planar region in accordance with the first calibration pattern, and instantaneously thereafter, changing to display a second luminance of the planar region in accordance with the second calibration pattern, by way of the display apparatus instantaneously switching display of the first calibration pattern followed by displaying the second calibration pattern.

14. A sensor calibration method comprising:

instantaneously changing luminance of a planar region within an angle of view of a sensor array as per a calibration pattern; and causing sensors constituting the sensor array to generate event signals upon detection of a change in incident light intensity, wherein:

the calibration pattern includes: (i) a first calibration pattern having high luminance regions and low luminance regions, and (ii) a second calibration pattern having high luminance regions and low luminance regions that are inverted as compared with the first calibration pattern, the display section operates to display a first luminance of the planar region in accordance with the first calibration pattern, and instantaneously thereafter, changing to display a second luminance of the planar region in accordance with the second calibration pattern, by way of the display apparatus instantaneously switching display of the first calibration pattern followed by displaying the second calibration pattern.

* * * * *